Sept. 19, 1967 P. H. SHERRON 3,341,988

TELEPHONE BOOTH

Filed Jan. 18, 1965 4 Sheets-Sheet 1

INVENTOR.
PERCIVAL H. SHERRON
BY
Busser, Smith & Harding
ATTORNEYS

INVENTOR.
PERCIVAL H. SHERRON
BY
Busser, Smith & Harding
ATTORNEYS

INVENTOR.
PERCIVAL H. SHERRON
BY
Busser, Smith & Harding
ATTORNEYS

Sept. 19, 1967 P. H. SHERRON 3,341,988

TELEPHONE BOOTH

Filed Jan. 18, 1965 4 Sheets-Sheet 4

INVENTOR.
PERCIVAL H. SHERRON
BY
Busser, Smith & Harding
ATTORNEYS

United States Patent Office 3,341,988
Patented Sept. 19, 1967

3,341,988
TELEPHONE BOOTH
Percival H. Sherron, Jamaica, N.Y. (% Sherron Metalic Corp., 1201 Flushing Ave., Brooklyn, N.Y. 11237)
Filed Jan. 18, 1965, Ser. No. 426,110
10 Claims. (Cl. 52—71)

ABSTRACT OF THE DISCLOSURE

A telephone booth constructed substantially completely of plastic elements of commercially available, simple shapes.

This invention relates generally to an improved telephone booth and more particularly to a telephone booth structure which is constructed so as to be fabricated largely from commercially available plastic shapes.

Prior telephone booths made of plastic have involved the use of special extruded or molded plastic shapes, which, of course, require expensive manufacturing techniques. It is the general object of this invention to provide a plastic telephone booth construction which can be fabricated from commercially available shapes. The commercially available plastic shapes are generally of a simple and regular nature such as bars, angles, channels, having cross-sectional shapes such as squares, circles, semi-circles, etc. It is these simple shapes that are employed in the telephone booth construction in accordance with the general object of the invention.

Another object of the invention is to provide a telephone booth having structural elements which can be fabricated easily and which can be assembled readily to form a strong structure.

Another object of the invention is to provide a telephone booth which employs in the construction thereof, wherever possible, plastic structural elements.

The above and other objects of the invention will become apparent from the following description when read in conjunction with the accompanying drawings, in which:

FIGURE 1 is a front elevation of a telephone booth in accordance with the invention;

FIGURE 2 in an elevation of the right side of the telephone booth shown in FIGURE 1;

Figure 1:
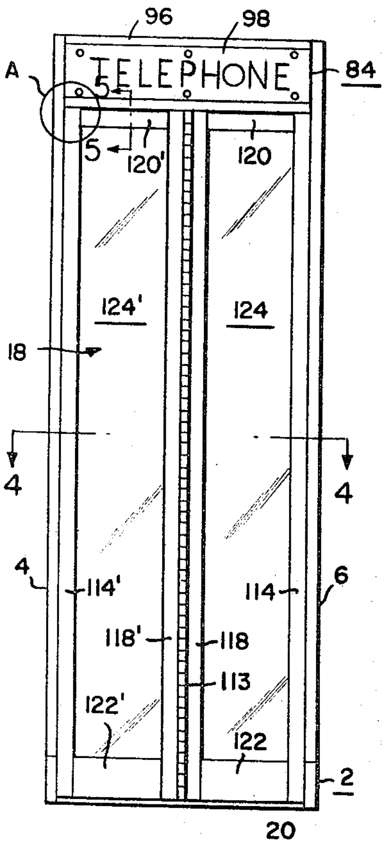
Figure 2:
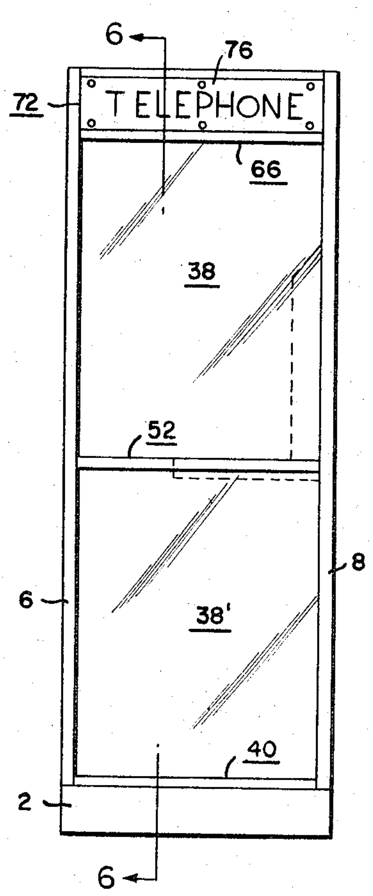
Figure 11:
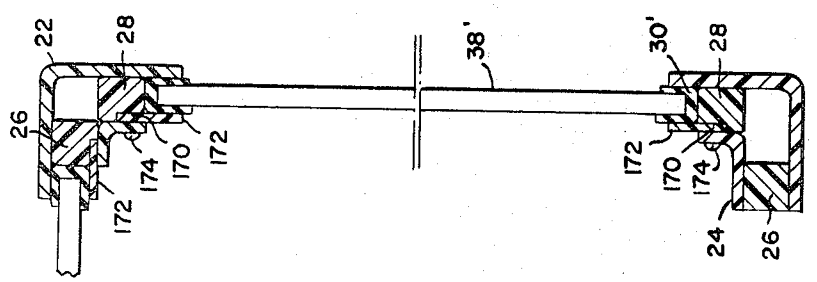
Figure 12:
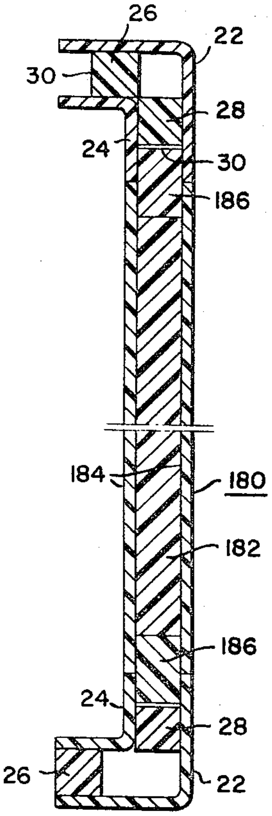
Figure 9:
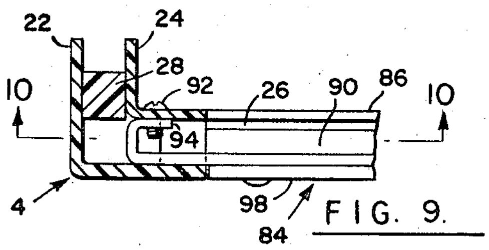
Figure 10:
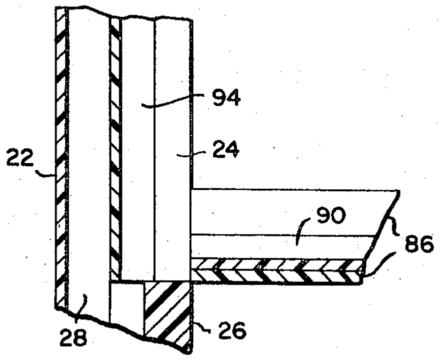
Figure 13:
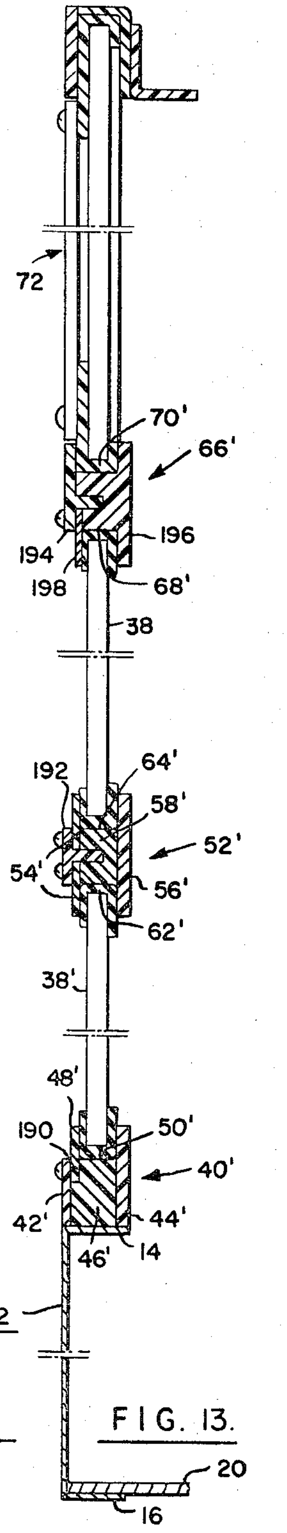
Figure 8:
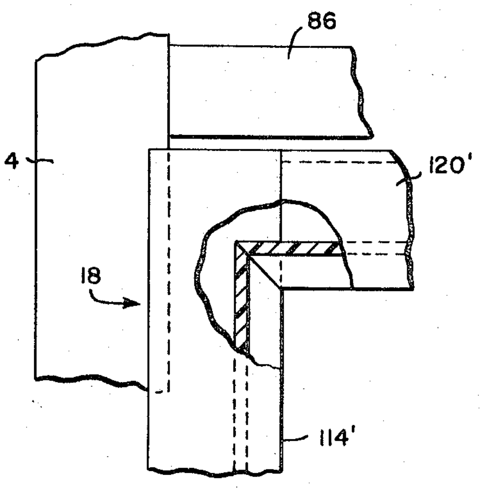

FIGURES 8, 9, and 10 are fragmentary detailed views illustrating a portion of the booth enclosed by the circle indicated at A in FIGURE 1;

FIGURES 11 and 12 are fragmentary sections illustrating modified forms of corner posts and side walls; and FIGURE 13 is a fragmentary vertical section of a modified form of panel supporting structure.

The word "plastic" as employed herein should be construed as referring to plastic materials such as acrylics, phenolics, polyesters or other similar plastics in their various well known forms including their reinforced forms. One type of plastic material found to be highly desirable for use in making the various parts of the telephone booth in accordance with this invention is a fiber glass reinforced polyester material sold under the trademark "Extren" by the Universal Molded Fiber Glass Corporation of Bristol, Virginia.

The telephone booth in accordance with the invention comprises the usual rectangular base framework 2 on which there are mounted a pair of front corner posts 4 and 6 and a pair of rear corner posts 8 and 10, each of the corner posts being mounted on one of the base corners. The base 2 comprises a vertically extending portion 12 and upper and lower inwardly extending flanges 14 and 16, respectively. The base 2 is provided with a clearance in the front of the booth for the booth door assembly 18. The booth is provided with the usual floor 20 which rests on top of the lower flange 16 of the base 2. Preferably, the base 2 and the floor 20 are made of steel.

Figure 4:
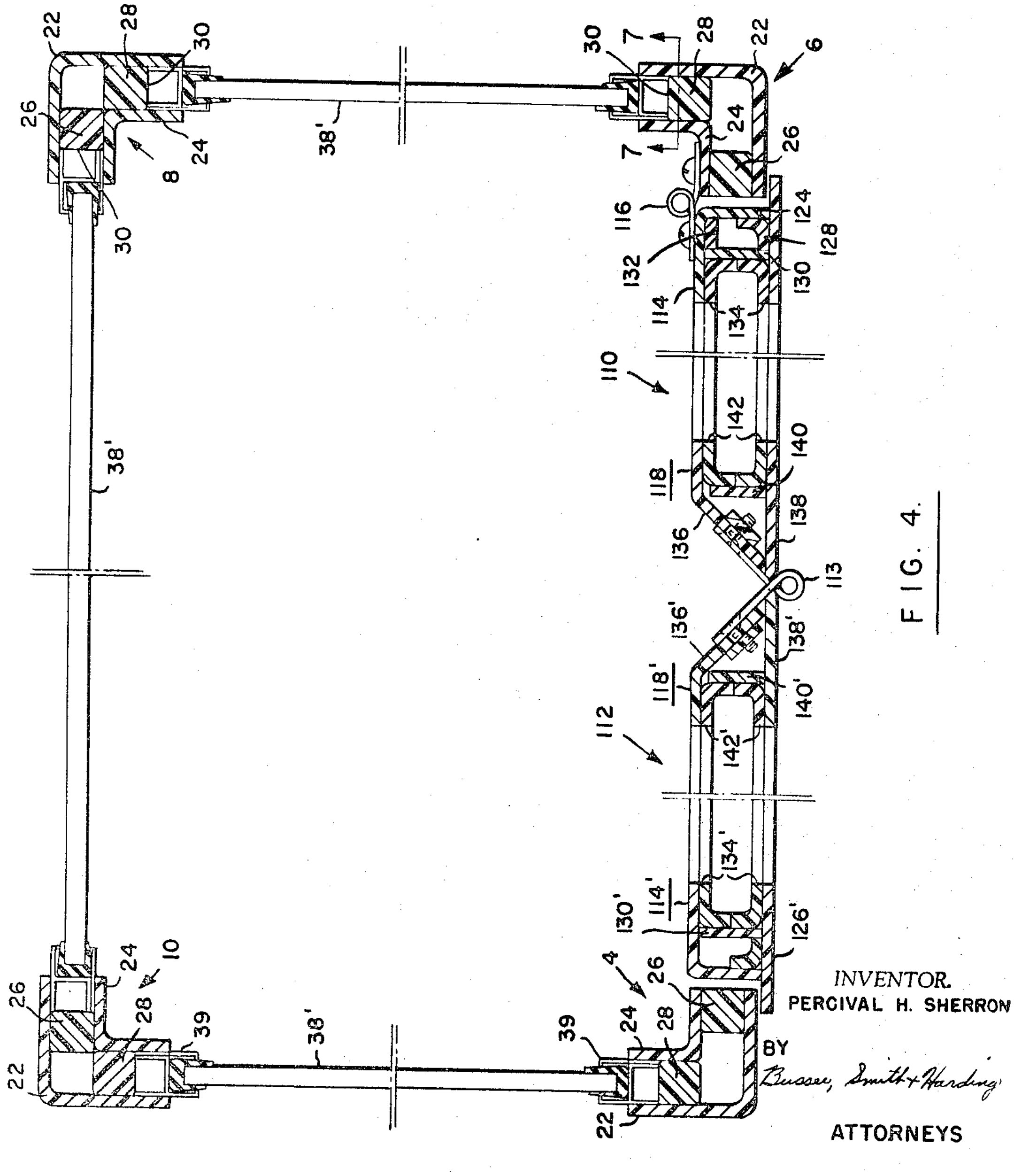
FIGURE 4 is a horizontal section taken on plane indicated by line 4—4 of FIGURE 1.
Figure 7:
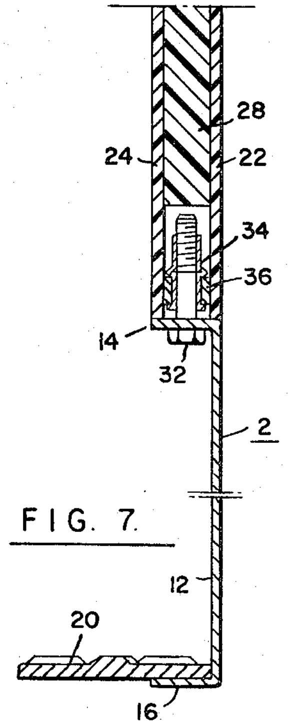
FIGURE 7 is fragmentary section taken on line 7—7 of FIGURE 4.

The construction of the corner posts for the telephone booth in accordance with the invention is shown in FIGURES 4 and 7. As will appear more fully hereinafter, thes corner posts are constructed of regular and simple parts, which parts are of the type which are commercially available. Each of the front corner posts 4 and 6 comprises outer and inner right angular members 22 and 24, respectively, having a pair of bars 26 and 28 positioned therebetween. The bars 26 and 28 have a square cross-section providing a pair of spaced parallel surfaces in bonded contact with opposed leg portions of the angular members 22 and 24. By this arrangement, the opposed leg portions of the angular members 22 and 24 are positioned in a parallel relationship. The angular members 22 and 24 extend from base 2 to the top of the booth with the bars 26 and 28 extending within the angular members approximately throughout the height of the booth. The legs of the angular members extending along the front of the booth terminate in alignment with a side of the bar 26 positioned therebetween to thereby provide a flat wall facing the door opening of the booth. The leg portions of the angular members extending along the sides of the booth extend beyond the bar 28 positioned therebetween to thereby define with said bar vertically extending channels 30. The channels cooperate with the side wall panel supporting means as will appear hereafter.

The rear corner posts 8 and 10 have construction substantially the same as the front corner posts 4 and 6 wherefore corresponding parts have been given like reference numerals. The only essential difference between the front and rear corner posts is that each of the rear corner posts 8 and 10 provides a pair of vertically extending channels 30 for accommodating the panel supporting means for the side and rear panels of the booth. This is achieved by positioning both of the bars 26 and 28 in recessed relation with respect to the ends of the legs of the angular members.

The individual parts of each corner post are assembled together by a suitable bonding agent, such as epoxy cement. The epoxy cement is applied at appropriate locations between the mating surfaces of the various parts of the corner posts. It will thus be apparent that the corner posts, 4, 6, 8 and 10 may be assembled without the use of screws or similar fastening devices wherefore the assembly of these corner posts may be accomplished quickly and easily.

Each of the corner posts 4, 6, 8 and 10 is secured at their bottom ends to the base 2 by a "rivnut" fastener as is shown in FIGURE 7. The screw 32 of the fastener extends through the upper flange 14 of the base 2 to engage the deformable sleeve 34 of the fastener which sleeve is contained within an extends through an opening in a plastic insert 36 bonded by a suitable adhesive to the opposed legs of the angular members of the corner post.

There are provided a plurality of frame members for supporting the panels which form the side and rear walls of the telephone booth. In the form of the telephone booth shown in the drawings the side and rear walls each comprise upper and lower transparent panels 38 and 38', respectively.

Figure 6:
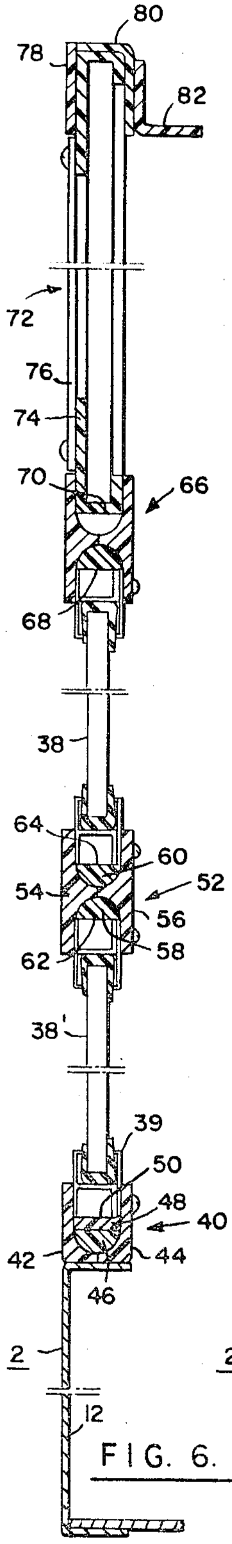
FIGURE 6 is a vertical section taken on line 6—6 of FIGURE 2.

There are provided horizontally extending lower panel supporting frames 40 which are mounted on the upper flange of the base 2. The frames 40 extend between the front and rear corner posts and between the rear corner posts to provide a support for the bottom ends of the lower panels 38'. Each of the panel supporting frames 40 is made entirely of a plurality of plastic components. As shown in FIGURE 6, each frame 40 consists of a pair of elongated right angular members 42 and 44 to provide a generally U-shaped cross-section, and a pair of elongated bars 46 and 48 positioned within spaced legs of members 42 and 44. Bar 46 has a semi-circular cross-section and bar 48 has a rectangular cross-section. The various parts forming the panel supporting frames 40 are arranged to define a horizontally, upwardly facing extending channel 50 and are bonded together by a suitable adhesive as in the case of the corner posts. In this arrangement the circular wall of bar 46 is in mating contact with corresponding round portions on each of the members 42 and 44, and the straight wall of bar 46 is in mating contact with a similar wall of the rectangular bar 48. The channel 50 is defined by a horizontally extending wall of bar 48 in cooperation with a pair of spaced vertically extending walls of the opposed parallel legs of the angular members 42 and 44.

There are provided horizontally extending intermediate panel supporting frames 52 which are secured at their ends to the corner posts and extend in spaced parallel relation to the lower panel supporting frames 40. The frames 52 provide channels for supporting the top ends of the lower panels 38' and the bottom ends of the upper panels 38. Each of the panel supporting frames 52 is made of a plurality of plastic components. Such components include a pair of elongated angular members 54 and 56 arranged to provide a generally H-shaped cross-section, and a pair of elongated bars 58 and 60 positioned within the spaced legs of the members 54 and 56. The bars 58 and 60 have a semi-circular cross-section and are arranged with the circular wall thereto in mating contact with the corresponding round portions on each of the members 54 and 56 as is evident in FIGURE 6. By this arrangement, each of the panel supporting frames 52 defines a horizontally extending, downwardly facing channel 62 and a horizontally extending, upwardly facing channel 64. The various parts forming the panel supporting frames 52 are bonded together by a suitable adhesive.

There are provided upper panel supporting frames 66 which are identical in construction with the intermediate frames 52 wherefore corresponding parts have been designated by corresponding reference numerals. The upper frames 66 extend in spaced parallel relation above the intermediate frames 52, each frame 66 providing a downwardly facing channel 68 and upwardly facing channel 70. The channels 68 provide support for the top ends of the upper panels 38.

Each of the channels 50, 62, 64, and 68 has the same cross-sectional dimension as the vertically extending channels 30 in the corner posts and these channels are adapted to receive the usual panel retaining structure 39 which engages the panel molding. The panel retaining structure 39 is conventional and, preferably, the panels 38 and 38' are made of glass or another suitable transparent material.

The channels 70 provide support for the lower edges of the usual side and rear lintels 72 at the upper portion of the booth. Each lintel 72 comprises plastic supporting frame 74 and the usual telephone sign panel 76 secured to horizontal frame members by suitable mounting screws. Each of the horizontal members of the frames 74 has a J-shaped cross-section with the hooked end being positioned within the channels 70 and the vertical leg providing the support portion for the panel 76. Mounted on the upper end of the frame 74 is a U-shaped channel comprising a straight member 78 and an L-shaped member 80. The members 78 and 80 are bonded together and to the upper leg of the frame 74 as is shown in FIGURE 6 and serve as top edges of the booth.

Each of the members 80 has an angle 82 bonded thereto, the angle providing a horizontal leg extending inwardly of the booth. The angle members 82 cooperate to provide a rectangular frame which serves to reinforce the booth.

Figure 5:
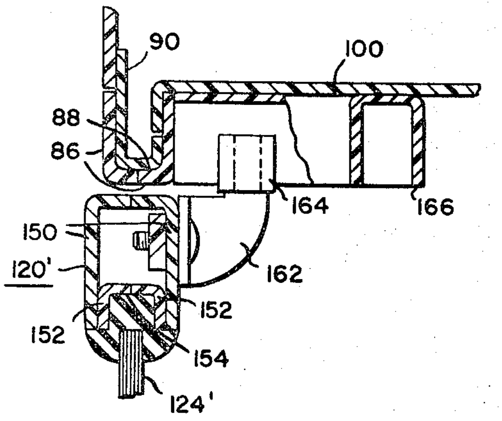
FIGURE 5 is a fragmentary section taken on line 5—5 of FIGURE 1.

The construction of the front lintel 84 is shown in detail in FIGURE 5 and in FIGURES 8, 9 and 10 which are enlarged views of a portion of the corner of the telephone booth enclosed by the circle indicated at A in FIGURE 1. In FIGURE 8 there is shown portions of the corner post 4, the left end of a horizontal support member 86 and the corner of the booth door assembly 18. Plastic member 86 extends between and is secured to the front corner posts 4 and 6 and comprises a pair of angular members arranged to provide upwardly facing channel 88 which receives a plastic member 90 having a J-shaped cross-section as is best shown in FIGURE 5. The ends 94 of member 90 extend between the members 22 and 24 of the front corner post and are secured to the members 26 by a screw 92. Extending in spaced parallel relation above support member 86 is a front lintel support 96 which is constructed in a manner similar to the upper lintel support shown in FIGURE 6 and provides a downwardly extending member for supporting the front lintel panel 98. The panel 98 is mounted at its lower end on member 90 by suitable mounting screws and at its upper end in a manner similar to the lintel mounting shown in FIGURE 6.

Figure 3:
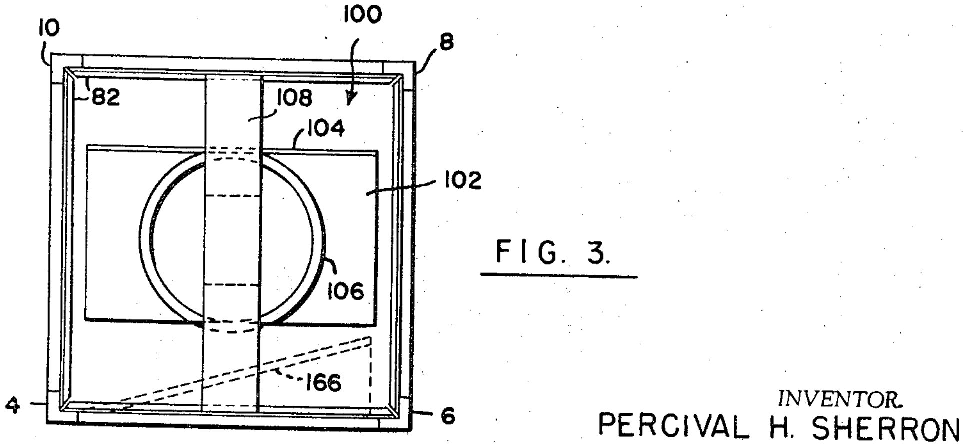
FIGURE 3 is a top view of the telephone booth shown in FIGURE 1 with the top cover removed.

The telephone booth ceiling structure is shown in FIGURE 3 and comprises a ceiling indicated generally at 100 which is supported on the corner posts and upper frames 66. The ceiling structure comprises a rectangular housing and the ceiling 100 is provided with a central panel 102 pivotally mounted on hinge 104 which extends laterally of the booth. The booth lighting means 106 is mounted above the panel 102 by a supporting channel 108 extending between the front and the rear of the booth. Various ceiling constructions may be used. For example, the hinged panel 102 may be arranged to pivot on a hinge which, like the channel member 108, extends from front to rear of the booth.

The door assembly 18 of the both comprises a pair of doors 110 and 112. The door 110 comprises a vertically extending post 114 which is attached to the right front corner post 6 by means of a hinge means 116. The door 110 also includes a vertically extending post 118. The posts 114 and 118 are secured together at their upper and lower ends by horizontal frame members 120 and 122, respectively. A door panel 124 is positioned between the upper and lower members 120 and 122 and between the door posts 114 and 118, the panel 124 being contained in channels formed in such members. Panel 124 is preferably made of glass.

The door post 114 is formed of a plurality of plastic members shown in cross-section in FIGURE 4. Such members comprise right angular member 124, straight member 126, right angular member 128, straight members 130 and 132, and a pair of angular members 134 arranged to define a vertically extending channel for the door panel.

Door post 118 comprises an angular member 136, a pair of straight members 138 and 140, and a pair of right angular members arranged to define a vertically extending channel for the door panel. The door 112 is constructed in a manner similar to the door 110 and since the door 112 comprises parts identical with parts contained in door 110 corresponding parts have been given corresponding reference numerals with primes applied. The doors 110 and 112 are pivotally secured together by a vertical piano hinge 113.

The construction of the members 120 and 120' is shown in FIGURE 5 wherein the cross-section of member 120' is shown. Member 120' comprises a pair of right angular members 150 having another pair of right angular members 152 nested therein to define a horizontally extending, downwardly facing channel 154 for receiving the upper edge of the door panel 124'. The lower door panel support members 122 and 122' may have a construction similar to the upper door panel support members.

A fitting 162 is affixed to member 120' at the top of the door and carries a swivel mounted roller 164. The roller 164 is adapted to pass within a guide channel 166 affixed to the underside of the ceiling 100. As shown in FIGURE 3, the guide panel 166 extends at an angle with respect to the front of the booth. By this arrangement, the free edge of the door assembly 18 is guided by the channel 166 as the door is opened and closed by a pivoting action on the hinges 116 and 113 as is conventional practice.

From the foregoing it will be evident that the telephone booth construction described herein provides a booth formed substantially completely of plastic elements which can be secured together with strong adhesives and which provide a sturdy construction. Moreover, the construction of the various units, such as the corner posts, the panel supporting frames, the doors, etc., involves the use of simple and commercially available plastic shapes. The use of units formed of plastic materials provides complete resistance to corrosion resulting from moisture or rain. Moreover, the non-plastic elements of the booth, such as the base 2, may be, if desired, formed of stainless steel or other suitable corrosion resistant material.

FIGURE 11 shows an alternate form of corner post construction wherein the corner post is adapted to provide a channel which is adapted to receive directly the molding of the side panels. To this end, the panel supporting channels of the corner posts must be made more narrow than those shown in FIGURE 4. This is achieved by providing a vertically extending cutout 170 in the bars 28 adjacent channel forming portion of the corner post, the cutout 170 receiving an elongated strip 172 which is secured in position by suitable mounting screws 174. This arrangement provides narrow panel receiving channels 30' adapted to receive and support the molding on the edges of the side panels.

FIGURE 12 shows an alternate side panel construction which may be used in acoustic booths. Each of the acoustic panels 180 comprises a polystryene core 182 with plastic panels 184 on both sides. The plastic panels 184 are adapted to extend between the corner posts of the booth and support at their vertically extending edges a pair of rectangular bars 186 which project outwardly from such edges. The bars 186 are adapted to be received in the vertical channels 30 provided by the corner posts.

FIGURE 13 shows an alternate form of panel supporting frames which are adapted to receive the molding of the side panels directly. To this end, the lower frame 40' comprises a pair of horizontally extending strips 42' and 44' with a rectangular bar 46' therebetween. The bar 46' is provided with a longitudinally extending cutout 190 adapted to receive a strip 48' which is held in position by mounting screws. By this arrangement, a horizontally extending, upwardly facing channel 50' is provided for receiving the lower edge of the bottom panel 38'.

The intermediate panel supporting frame 52' comprises a pair of outer strips 54' and inner strip 56' positioned in spaced parallel relation by a bar 58' therebetween. The strips 54' are held in position by a T-shaped member 192 and a plurality of mounting screws as shown in FIGURE 13. The intermediate frame provides a downwardly facing channel 62' for receiving the upper edge of the lower panel and an upwardly facing channel 64' for receiving the lower edge of the upper panel.

The upper panel supporting frame 66' comprises a pair of interlocked members 194 and 196 and a strip 198 arranged to provide a downwardly facing channel 68' for the upper edge of the upper panel and an upwardly facing panel 70' for receiving the lintel structure 72 which is identical to the lintel structure shown in FIGURE 6.

It will be evident that various modifications in the construction and arrangement of parts may be made in the structure embodying the invention as disclosed herein without departing from the scope of the invention as set forth in the following claims.

What is claimed is:

1. In a telephone booth made substantially completely of plastic elements, the combination comprising a base, and a plurality of upright corner posts supported at their lower ends on said base, each of said corner posts being made of a plurality of plastic members of simple shapes, each corner post including a pair of right angular plastic members and a pair of members having a rectangular cross-section, each of said rectangular members being positioned between a pair of opposed legs of said right angular members with a pair of spaced parallel walls in contact with said opposed legs, each of said rectangular members being secured to said opposed legs so that said legs are positioned in spaced parallel relation, said corner posts extending vertically from the base to the top of the telephone booth.

2. A telephone booth according to claim 1 wherein at least one of said rectangular members in each corner post is recessed from the vertically extending edges of the spaced angular members adjacent thereto to define a vertically extending channel in the corner post.

3. In a telephone booth made substantially of plastic elements, the combination comprising a base, a plurality of upright corner posts supported at their lower ends on said base, each of said corner posts being made of a plurality of plastic members of simple shapes, a plurality of frame members extending horizontally between said corner posts, a plurality of side panels forming the walls of the telephone booth, said corner posts providing vertically extending channels for supporting the panels, said frames providing horizontally extending channels for supporting the panels, each of said frames being made of a plurality of plastic members of simple shapes and including a pair of members providing spaced parallel walls for defining said horizontally extending channels.

4. A telephone booth according to claim 3 wherein said spaced parallel wall providing members of said frames comprise a pair of right angular members providing opposed legs and including a member positioned within the space between said opposed legs and providing a horizontally extending wall defining a portion of said horizontal channels of said frames.

5. A telephone booth according to claim 3 wherein said spaced parallel wall providing members of said frames comprise a pair of angular members arranged to provide an H-shaped cross-section and including a pair of members positioned within the hollows of said H-shaped configuration to provide horizontally extending walls which define a portion of said horizontally extending panel supporting channels, said frame members being secured together adhesively.

6. In a telephone booth made substantially of plastic elements, the combination comprising a base, a plurality of upright corner posts supported at their lower ends on said base, each of said corner posts being made of a plurality of plastic members of simple shapes, each corner post including a pair of right angular plastic members and a pair of members having a rectangular cross-section, each of said rectangular members being positioned between a pair of opposed legs of said right angular members with a pair of spaced parallel walls in contact with said opposed legs, each of said rectangular members being secured to said opposed legs so that said legs are positioned in spaced parallel relation, a plurality of frame members extending horizontally between said corner posts, a plurality of side panels forming the walls of the telephone booth, said corner posts providing vertically extending channels for supporting the panels, said frames providing horizontally extending channels for supporting the panels, each of said frames being made of a plurality of plastic members of simple shapes and including a pair of members providing spaced parallel walls for defining said horizontally extending channels.

7. A telephone booth according to claim 6 wherein said spaced parallel wall providing members of said frames comprise a pair of right angular members providing opposed legs and including a member positioned within the space between said opposed legs and providing a horizontally extending wall defining a portion of said horizontal channels of said frames.

8. A telephone booth according to claim 6 wherein said spaced parallel wall providing members of said frames comprise a pair of angular members arranged to provide an H-shaped cross-section and including a pair of members positioned within the hollows of said H-shaped configuration to provide horizontally extending walls which define a portion of said horizontally extending panel supporting channels.

9. A telephone booth according to claim 6 wherein at least one of said rectangular members in each corner post is recessed from the vertically extending edges of the spaced angular members adjacent thereto to define a vertically extending channel in the corner post.

10. In a telephone booth made substantially of plastic elements, the combination comprising a base, a plurality of upright corner posts supported at their lower ends on said base and made of a plurality of plastic members of simple shapes and including a pair of right angular plastic members and a pair of members having a rectangular cross-section, each of said rectangular members being positioned between a pair of opposed legs of said right angular members with a pair of spaced parallel walls in contact with said opposed legs, each of said rectangular members being secured to said opposed legs so that said legs are positioned in spaced parallel relation, a plurality of horizontally extending frames extending between said corner posts, a plurality of panels for forming the walls of the telephone booth, said corner posts and said frames providing channels for supporting the edges of said panels, and a door assembly movable between open and close positions for providing access to telephone booth, said door assembly comprising a pair of hinged doors each of which is made of a plurality of plastic elements of either angular or straight configuration.

References Cited

UNITED STATES PATENTS

| | | | |
|---|---|---|---|
| 2,248,810 | 7/1941 | Corso | 52—28 |
| 2,928,141 | 3/1960 | Sherron | 52—71 |
| 3,225,498 | 12/1965 | Sherron | 52—27 |

JOHN E. MURTAGH, *Primary Examiner.*

C. G. MUELLER, *Assistant Examiner.*